(12) United States Patent
Masuda

(10) Patent No.: US 9,313,253 B2
(45) Date of Patent: Apr. 12, 2016

(54) COMMUNICATION APPARATUS, COMMUNICATION SYSTEM, COMMUNICATION METHOD, AND PROGRAM

(75) Inventor: Yasuto Masuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1001 days.

(21) Appl. No.: 13/474,039

(22) Filed: May 17, 2012

(65) Prior Publication Data

US 2012/0317304 A1     Dec. 13, 2012

(30) Foreign Application Priority Data

Jun. 8, 2011  (JP) .................................. 2011-128358

(51) Int. Cl.
*H04L 29/06* (2006.01)
*H04L 29/08* (2006.01)

(52) U.S. Cl.
CPC .......... *H04L 67/02* (2013.01); *H04L 29/06176* (2013.01)

(58) Field of Classification Search
CPC ..... H04L 67/02; H04L 65/80; H04L 65/4084; H04L 29/06176; H04N 21/8465; G06F 17/30899
See application file for complete search history.

(56) References Cited

U.S. PATENT DOCUMENTS

| | | | | | |
|---|---|---|---|---|---|
| 4,422,171 | A | * | 12/1983 | Wortley et al. ................ | 714/748 |
| 5,892,980 | A | * | 4/1999 | Tal ............................ | H04L 5/14 710/48 |
| 6,091,709 | A | * | 7/2000 | Harrison ............. | H04L 12/5695 370/235 |
| 6,985,936 | B2 | * | 1/2006 | Agarwalla ........ | G06F 17/30902 707/999.01 |
| 7,058,941 | B1 | * | 6/2006 | Venkatesan ............... | G06F 8/68 707/999.006 |
| 7,512,767 | B2 | * | 3/2009 | Ritzau ..................... | G06F 12/08 375/240 |
| 7,697,517 | B2 | * | 4/2010 | Yazaki ................ | H04L 41/0896 370/389 |
| 7,751,427 | B2 | * | 7/2010 | Shinohara ........... | H04L 12/5601 370/229 |
| 7,916,724 | B2 | * | 3/2011 | Shinohara ........... | H04L 12/5601 370/229 |
| 7,953,004 | B2 | * | 5/2011 | Poulin ................. | H04L 12/4633 370/230 |
| 7,969,873 | B2 | * | 6/2011 | Rozental ............. | H04L 12/2801 370/230 |
| 8,014,452 | B2 | * | 9/2011 | Kubo et al. ............... | 375/240.26 |
| 8,112,520 | B2 | * | 2/2012 | Mizuno ................. | G06F 1/3203 365/221 |
| 8,184,649 | B2 | * | 5/2012 | Bammesreiter ......... | H04L 47/10 370/412 |
| 8,271,683 | B2 | * | 9/2012 | Munson .................. | H04L 67/26 709/238 |
| 8,345,680 | B2 | * | 1/2013 | Poulin ..................... | H04L 12/66 370/389 |
| 8,736,627 | B2 | * | 5/2014 | Brothers .................. | G06T 1/60 345/422 |
| 8,953,469 | B2 | * | 2/2015 | Oike ...................... | H04N 7/141 370/252 |

(Continued)

FOREIGN PATENT DOCUMENTS

JP     2010-45760      2/2010
JP     2010-246146     10/2010

*Primary Examiner* — Jimmy H Tran
(74) *Attorney, Agent, or Firm* — Hazuki International, LLC

(57) ABSTRACT

A communication apparatus includes: a buffer that accumulates a plurality of data blocks; a buffer controller that reads the data blocks from the buffer to transmit the data blocks; and a transmission unit that transmits, when any of the data blocks is discarded from the buffer during the transmission of the data blocks, dummy data in place of an untransmitted portion of the data block having been discarded.

6 Claims, 16 Drawing Sheets

(56) References Cited

U.S. PATENT DOCUMENTS

| | | | |
|---|---|---|---|
| 2001/0029446 A1* | 10/2001 | Cho | 704/201 |
| 2005/0147033 A1* | 7/2005 | Chin | H04N 21/2343 370/229 |
| 2005/0163141 A1* | 7/2005 | Katayama | 370/412 |
| 2007/0104007 A1* | 5/2007 | Mizuno | 365/221 |
| 2007/0143807 A1* | 6/2007 | Suneya | 725/115 |
| 2008/0049846 A1* | 2/2008 | Nagafuji | 375/240.28 |
| 2009/0003384 A1* | 1/2009 | Rozental | H04L 12/2801 370/485 |
| 2010/0172357 A1* | 7/2010 | Poulin | H04L 12/4633 370/395.4 |
| 2012/0050453 A1* | 3/2012 | Oike | H04N 7/141 348/14.08 |
| 2013/0028078 A1* | 1/2013 | Masuda | H04L 47/15 370/229 |
| 2013/0064248 A1* | 3/2013 | Poulin | H04L 12/66 370/394 |
| 2014/0233420 A1* | 8/2014 | Honda | H04L 65/605 370/252 |

* cited by examiner

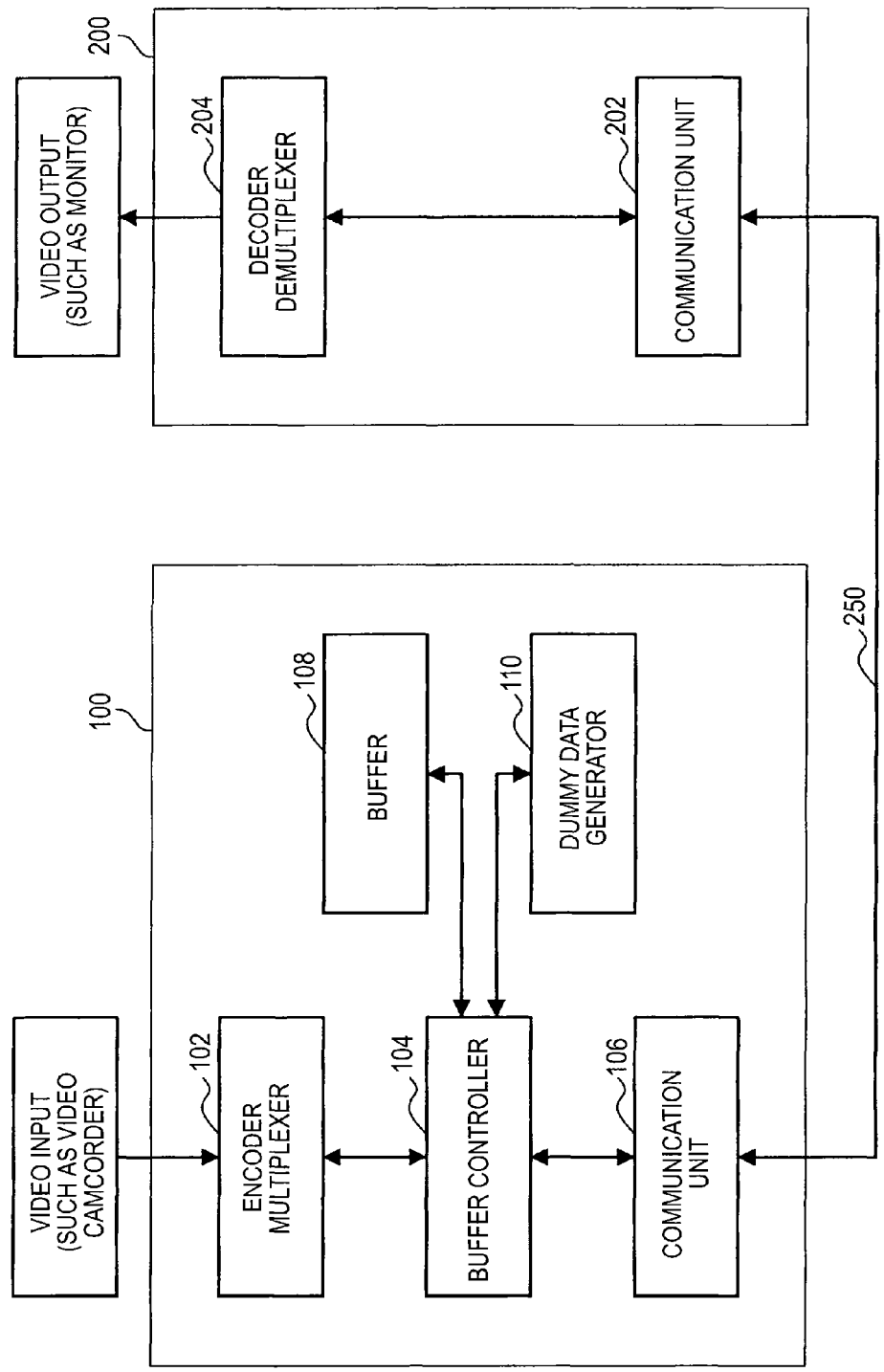

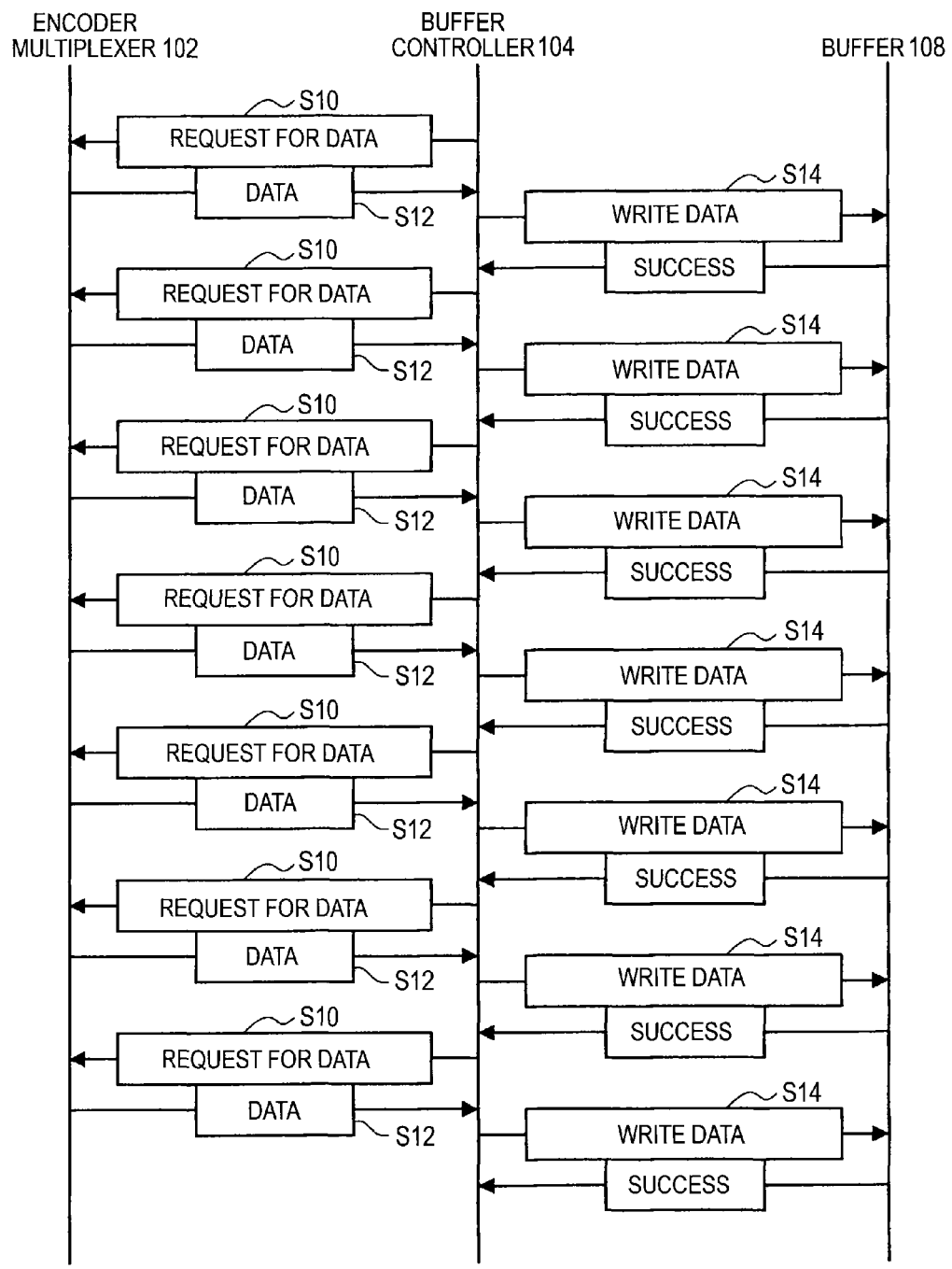

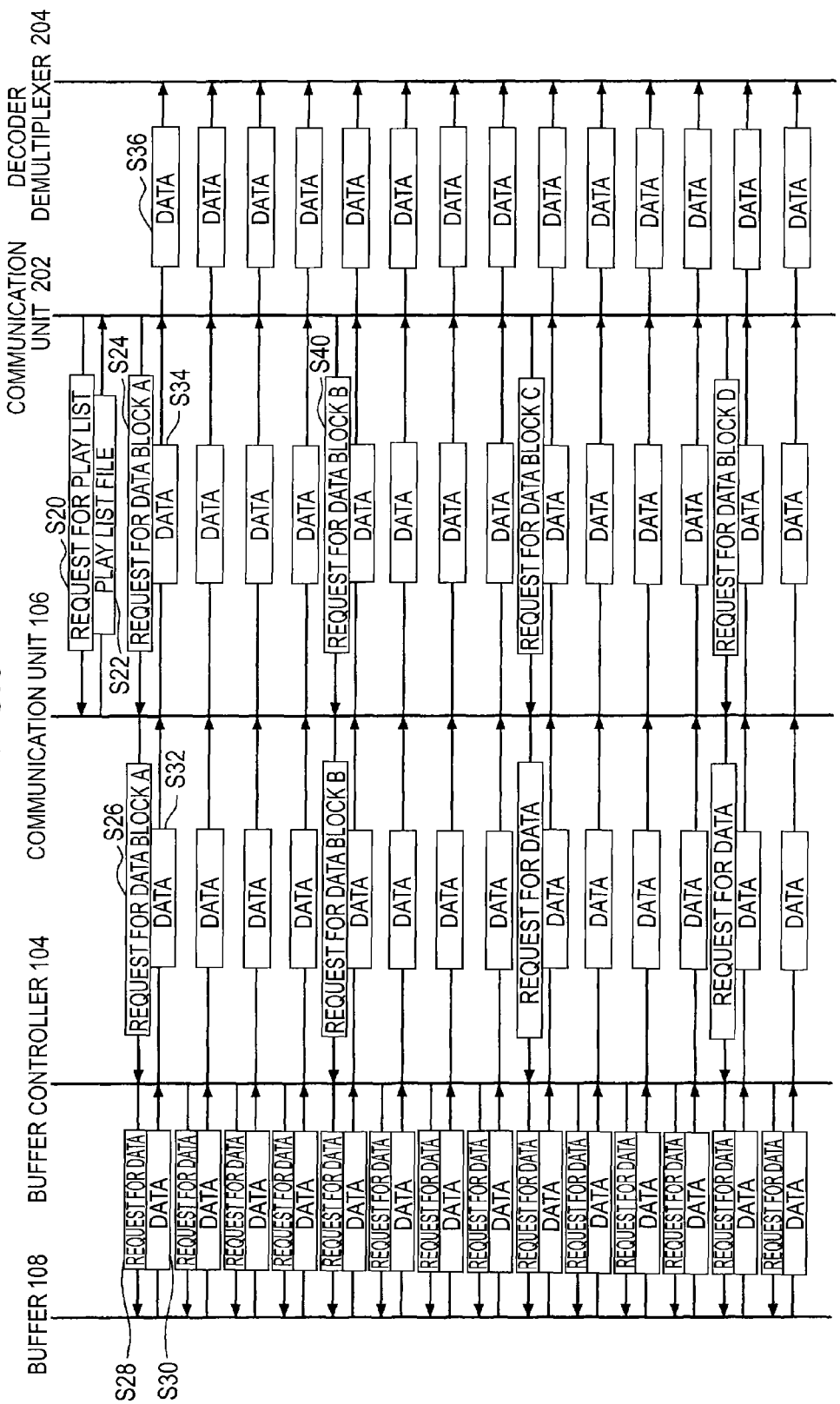

FIG.4

```
EXAMPLE OF PLAY LIST

#EXTM3U
#EXT-X-TARGETDURATION:8
#EXT-X-MEDIA-SEQUENCE:1
#EXTINF:8, http://www.example.com/datablockA.ts
#EXTINF:8, http://www.example.com/datablockB.ts
#EXTINF:8, http://www.example.com/datablockC.ts
```

```
EXAMPLE OF DATA BLOCK REQUEST

GET /datablockA.ts HTTP/1.1
Host: www.example.com
```

```
EXAMPLE OF DATA BLOCK ACKNOWLEDGMENT

HTTP/1.1 200 OK
Date: Mon, 09 Aug 2010 10:38:30 GMT
Content-Length: 1920000
Cache-Control: no-cache
Content-Type: video/mpeg
Connection: Keep-Alive

[DATA IN DATA BLOCK A]
```

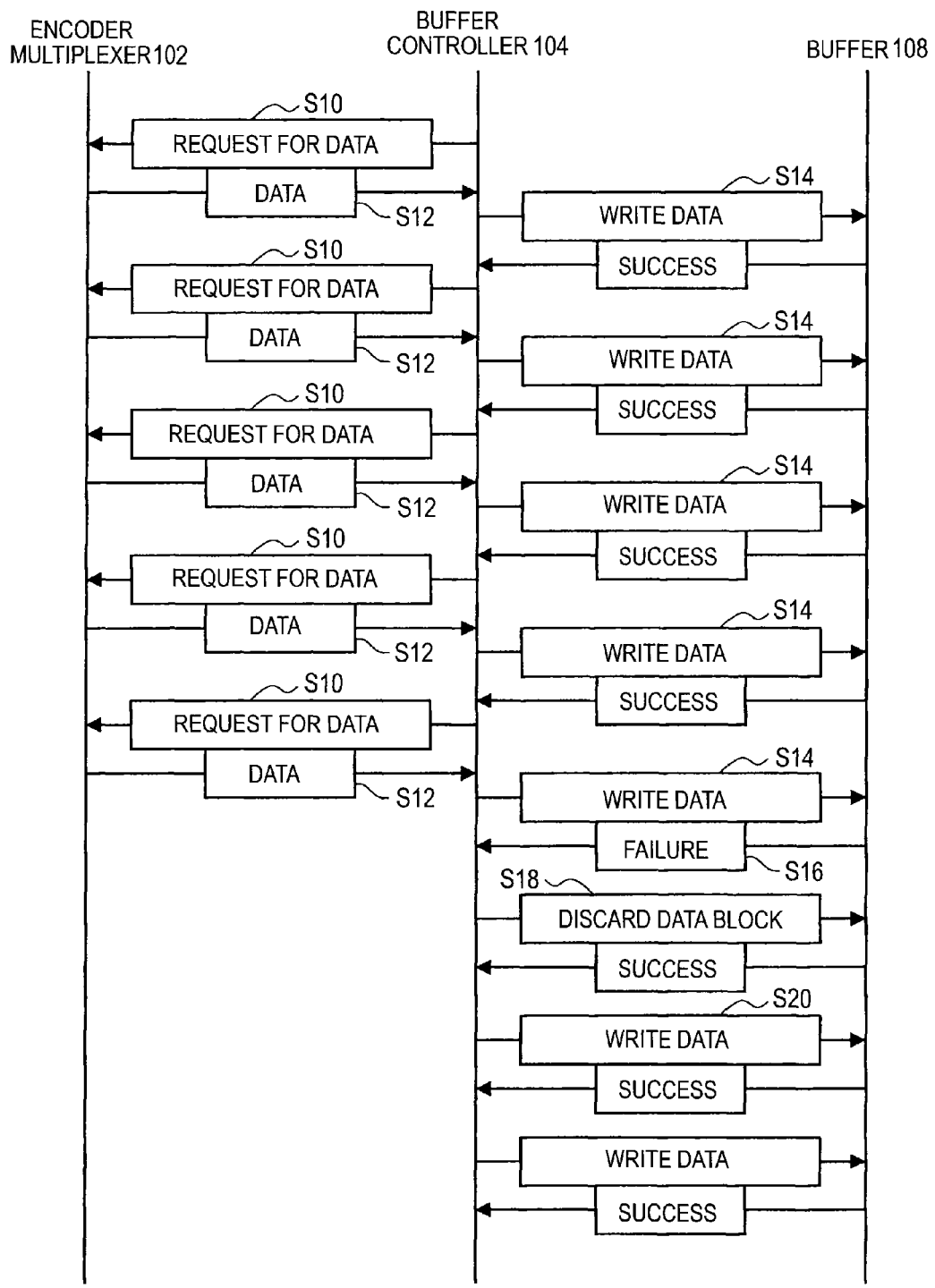

COMMUNICATION APPARATUS, COMMUNICATION SYSTEM, COMMUNICATION METHOD, AND PROGRAM

FIELD

The present disclosure relates to a communication apparatus, a communication system, a communication method, and a program.

BACKGROUND

In recent years, HTTP adaptive streaming is known as a method in which a receiver successively acquires fragmented video data based on HTTP. HTTP adaptive streaming operates based on a variety of specifications, such as IETF HTTP Live Streaming, Adobe HTTP Dynamic Streaming, and Microsoft Smooth Streaming.

IETF HTTP Live Streaming
(http://tools.ietf.org/html/draft-pantos-http-live-streaming-05)

Adobe HTTP Dynamic Streaming
(http://www.adobe.com/products/httpdynamicstreaming/)

Microsoft HTTP Smooth Streaming
(http://technet.microsoft.com/ja-jp/library/dd775200.aspx)

SUMMARY

In a system based on the adaptive streaming described above, a distribution server encodes content at a plurality of rates, fragments each of the encoded data, and provides them as fragmented files. A client can follow any change in throughput during content distribution by downloading fragmented files encoded at a bit rate suitable for the throughput between the distribution server and the client.

The technology of the related art, which assumes that a large-scale server having a sufficient buffer capacity is used for transmission, however, does not expect that a transmitter discards data when the capacity of the buffer is reached.

On the other hand, when a built-in apparatus, which typically has a small capacity buffer, uses adaptive streaming distribution to transmit live videos, it is conceivable that fragmented data being transmitted can disadvantageously be discarded when the amount of data accumulated in the buffer reaches the capacity thereof. In this case, a transmitter can terminate an HTTP session, resulting in communication breakdown.

To avoid errors caused by packet loss and jitter, in the technology described in JP-A-2010-045760, a receiver performs buffering to eliminate jitter. The technology does not, however, offer any measures against jitter that has not been eliminated by the buffering. JP-A-2010-246146 is exemplified as another related art document.

It is therefore desirable to provide a mechanism that allows communication to be maintained even when data being transmitted is discarded in a buffer in a transmitter.

According to an embodiment of the present disclosure, there is provided a communication apparatus including a buffer that accumulates a plurality of data blocks, a buffer controller that reads the data blocks from the buffer to transmit the data blocks, and a transmission unit that transmits, when any of the data blocks is discarded from the buffer during the transmission of the data blocks, dummy data in place of an untransmitted portion of the data block having been discarded.

The communication apparatus may further include a dummy data generator that generates, when any of the data blocks is discarded from the buffer during the transmission of the data blocks, dummy data corresponding to the untransmitted portion of the data block having been discarded, and the transmission unit may transmit not only the data blocks read from the buffer but also the dummy data in place of the untransmitted portion of the data block having been discarded when the dummy data is generated.

The data may be expressed in an MPEG2-TS format, and a predetermined number of TS packets may form each of the data blocks. The dummy data generator may generate, when any of the data blocks is discarded during the transmission of the data blocks, the dummy data including data corresponding to an untransmitted portion of a TS packet that has been cut halfway and a TS packet that is yet to be transmitted.

The data may be expressed in an MP4 format, and a MOOF may form each of the data blocks. The dummy data generator may generate, when any of the data blocks is discarded during the transmission of the data blocks, data corresponding to an untransmitted portion of the MOOF as the dummy data.

According to another embodiment of the present disclosure, there is provided a communication system including a communication apparatus including a buffer that accumulates a plurality of data blocks, a buffer controller that reads the data blocks from the buffer to transmit the data blocks in response to a transmission request, and a transmission unit that transmits, when any of the data blocks is discarded from the buffer during the transmission of the data blocks, dummy data in place of an untransmitted portion of the data block having been discarded, and a reception apparatus that transmits the transmission request to the communication apparatus and receives the data blocks and the dummy data transmitted from the transmission unit.

According to still another embodiment of the present disclosure, there is provided a transmission method including accumulating a plurality of data blocks in a buffer and reading the data blocks to transmit the data blocks, and transmitting, when any of the data blocks is discarded from the buffer during the transmission of the data blocks, dummy data in place of an untransmitted portion of the data block having been discarded.

According to yet another embodiment of the present disclosure, there is provided a program that allows a computer to function as means for accumulating a plurality of data blocks in a buffer and reading the data blocks to transmit the data blocks, and means for transmitting, when any of the data blocks is discarded from the buffer during the transmission of the data blocks, dummy data in place of an untransmitted portion of the data block having been discarded.

According to the embodiments of the present disclosure, communication can be maintained even when data being transmitted is discarded in a buffer in a transmitter.

BRIEF DESCRIPTION OF THE DRAWINGS

FIG. 1 is a schematic view showing a system according to an embodiment that encodes a live video in real time and distributes the live video in adaptive streaming;

FIG. 2 is a diagrammatic view showing a sequence in which encoded data is accumulated in a buffer in a transmitter;

FIG. 3 is a diagrammatic view showing a sequence in which a receiver acquires data;

FIG. 4 is a diagrammatic view showing examples of a play list file, a data block acquisition request, and a data block acknowledgment;

FIG. 5 is a diagrammatic view showing a sequence carried out when the amount of data reaches the upper limit of the capacity of the buffer in the sequence in which encoded data is accumulated in the buffer in the transmitter;

DETAILED DESCRIPTION

Figure 6:
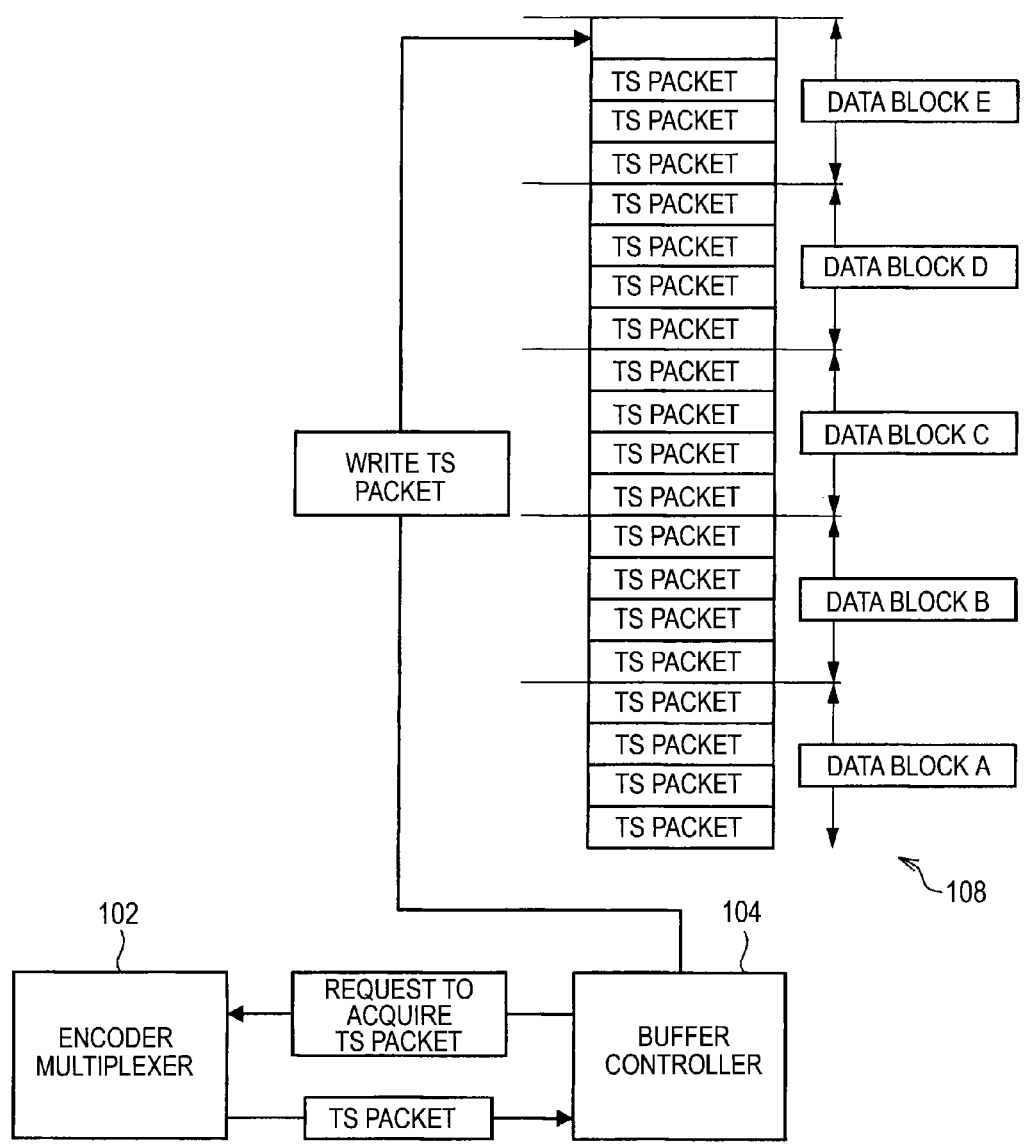
FIG. 6 is a diagrammatic view showing that data blocks A to D have been written to the buffer and a TS packet in a data block E is being written to the buffer in accordance with the sequence shown in FIG. 2.

Preferred embodiments of the present disclosure will be described below in detail with reference to the accompanying drawings. In the present specification and drawings, components having substantially the same functional configurations have the same reference characters, and no redundant description of these components will be made.

The description will be made in the following order.

1. Example of configuration of system
2. Example of sequence in which encoded data is accumulated in buffer
3. Example of sequence in which receiver acquires data
4. Examples of play list file, data block acquisition request, data block acknowledgment
5. Example of sequence carried out when amount of data reaches upper limit of buffer capacity
6. Example of data acquisition sequence carried out when data block being acquired is unexpectedly deleted from buffer during data block acquisition
7. Example of sequence in which dummy data is generated to maintain downloading
8. Operation of generating dummy data
9. Example of contents of TS packet transmitted as dummy data
10. Example of MP4 file format 1. Example of Configuration of System A schematic configuration of a system according to a first embodiment of the present disclosure will first be described with reference to FIG. 1. FIG. 1 is a schematic view showing a system according to the present embodiment that encodes a live video in real time and distributes the live video in adaptive streaming. A transmitter 100 and a receiver 200 are connected to each other via an IP network 250. The transmitter 100 and the receiver 200 may alternatively be connected to each other via a wireless communication network.

The transmitter 100 includes an encoder multiplexer 102, a buffer controller 104, a communication unit 106, a buffer 108, and a dummy data generator 110. The encoder multiplexer 102 in the transmitter 100 encodes video inputs sent from a video camcorder or any other external apparatus and multiplexes the encoded videos in an MPEG2-TS or MP4 format. The data outputted from the encoder multiplexer 102 passes through the buffer controller 104 and is accumulated in the buffer 108. The communication unit 106 waits for a data acquisition request in an HTTP format from the receiver 200. Upon reception of a data acquisition request, the communication unit 106 acquires data according to the request from the buffer 108 via the buffer controller 104 and send the data to the receiver 200.

The receiver 200 includes a communication unit 202 and a decoder demultiplexer 204. The receiver 200, which has transmitted the data acquisition request to the transmitter 100 via the communication unit 202 and acquired data blocks according to the request, sends the acquired data to the decoder demultiplexer 204. The decoder demultiplexer 204 separates a multiplexed stream into individual streams, decodes the data in the streams, and outputs the decoded data to a monitor or any other similar device.

The configuration shown in FIG. 1 can be formed of hardware (circuit) or a combination of a CPU (central processing unit) and software (program) that makes the CPU function. In the latter case, the program can be stored in a memory or any other storage device provided in the transmitter 100 or the receiver 200 or in an optical disk or any other storage medium loaded in a storage medium drive externally connected to the transmitter 100 or the receiver 200.

2. Example of Sequence in which Encoded Data is Accumulated in Buffer

FIG. 2 is a diagrammatic view showing a sequence in which encoded data is accumulated in the buffer 108 in the transmitter 100. The buffer controller 104 requests the encoder multiplexer 102 to send data in step S10 and acquires the data in step S12, as shown in FIG. 2. The buffer controller 104 then writes the acquired data to the buffer 108 in step S14. The processes are repeated afterward.

3. Example of Sequence in which Receiver Acquires Data

FIG. 3 is a diagrammatic view showing a sequence in which the receiver 200 acquires data. The communication unit 202 in the receiver 200 first sends a play list request to the communication unit 106 in the transmitter 100 in step S20 and acquires a play list file from the communication unit 106 in step S22. The play list file has a URL list of fragmented files written therein. The communication unit 202 transmits a request to acquire a data block A in the play list file (URL of data block A) in step S24.

The communication unit 106, which has received the data acquisition request, requests the buffer controller 104 to send a relevant range of data (step S26). The buffer controller 104 requests the buffer 108 to send relevant data (step S28), reads the relevant data from the buffer 108 (step S30), and sends the data to the communication unit 106 (step S32). The communication unit 106 adds an HTTP response header to the data sent from the buffer controller 104 and sends the resultant data to the communication unit 202 in the receiver 200 (step S34). The communication unit 202 sends the data to the decoder demultiplexer 204 (step S36), which reproduces a video. The receiver 200, when it finishes downloading the data block A, acquires the following data block B in the play list file (step S40 and the following steps). The play list file is updated when reread.

As described above, in the adaptive streaming, data is fragmented into divided data blocks, each of which is transmitted from the transmitter 100 whenever the receiver 200 specifies an URL in the play list and issues a request for the data block. Even when the communication band bit rate changes during data transmission, for example, the receiver 200 can request a data block of an appropriate bit rate by requesting the transmitter 100 to send fragmented data blocks instead of sending data of a relatively long length at once, as described above. Data can therefore be stably received, for example, even when the band becomes unstable, whereby the configuration described above is particularly suitable, for example, for a case where live video data is received.

4. Examples of Play List File, Data Block Acquisition Request, Data Block Acknowledgment FIG. 4 is a diagrammatic view showing examples of the play list file, the data block acquisition request, and a data block acknowledgment. FIG. 4 shows a case where IETF HTTP Live Streaming is used. In IETF HTTP Live Streaming, a play list file is expressed in an m3u8 format and a data file is expressed in an MPEG2-TS format. The play list shown in FIG. 4 has three data blocks fragmented every 8 seconds written therein. A single data block is handled as a single file containing a TS packet corresponding to a period of 8 seconds. Data acquisition is performed based on an HTTP GET command.

5. Example of Sequence Carried Out when Amount of Data Reaches Upper Limit of Buffer Capacity FIG. 5 is a diagrammatic view showing a sequence carried out when the amount of data reaches the upper limit of the capacity of the buffer 108 in the sequence in which encoded data is accumulated in the buffer 108 in the transmitter 100. The sequence carried out before the amount of data reaches the upper limit of the capacity of the buffer 108 is the same as that shown in FIG. 2. When the amount of data reaches the upper limit of the capacity of the buffer 108, writing operation performed by the buffer controller 104 causes an error (step S16). At this point, the buffer controller 104 deletes the oldest data block (step S18) and writes data in the free area (step S20).

FIGS. 6 to 9 are diagrammatic views showing the operation in FIG. 5. FIG. 6 shows that the data blocks A to D have been written to the buffer 108 and a TS packet in a data block E is being written to the buffer 108 in accordance with the sequence shown in FIG. 2.

Figure 7:
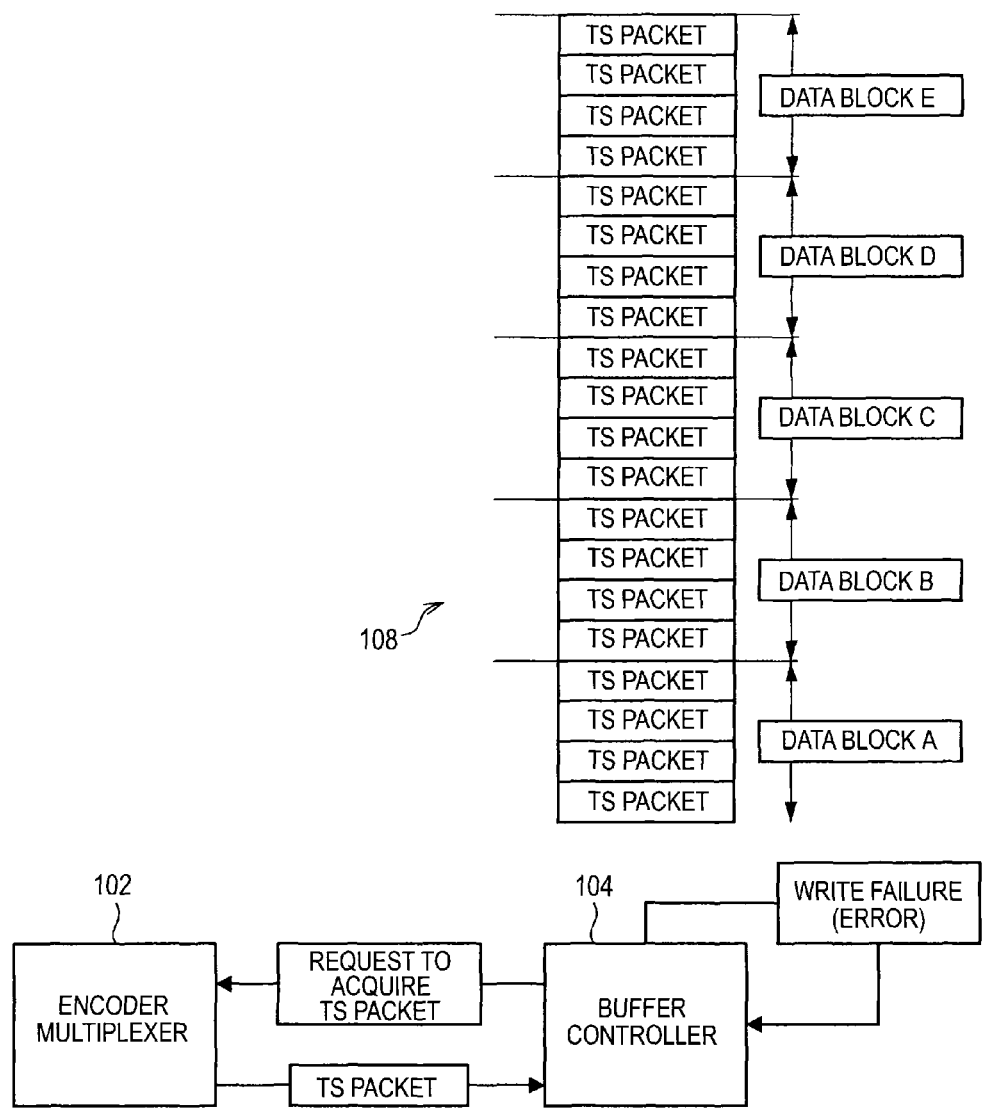
FIG. 7 is a diagrammatic view showing a case where the data blocks A to E have been written to the buffer and the amount of data reaches the upper limit of the capacity of the buffer.

FIG. 7 shows a case where the data blocks A to E have been written to the buffer 108 and the amount of data reaches the upper limit of the capacity of the buffer 108. In this case, since no more TS packet can be written to the buffer 108, writing operation performed by the buffer controller 104 causes an error.

Figure 8:
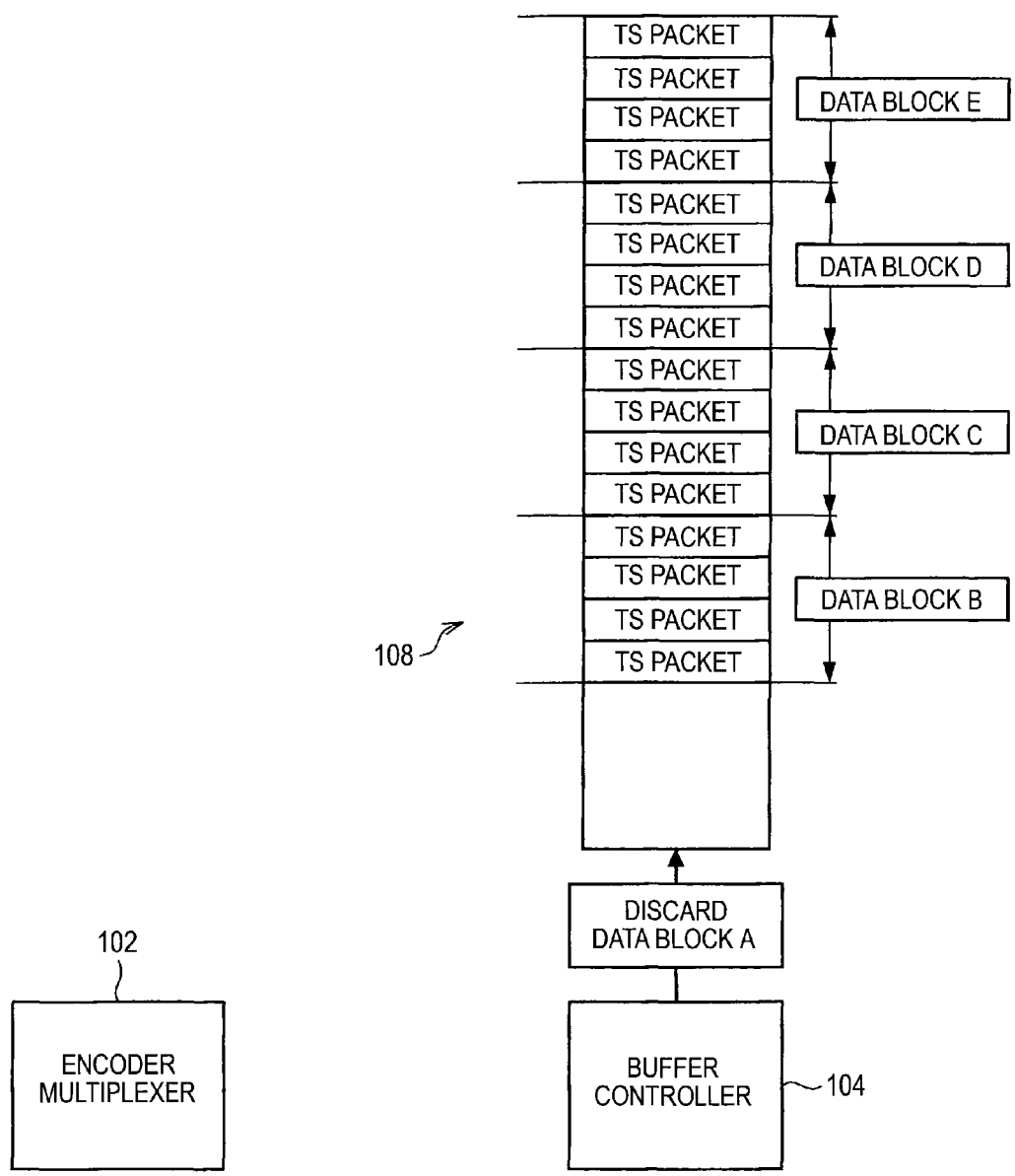
FIG. 8 is a diagrammatic view showing a state in which after writing operation performed by a buffer controller causes an error, the buffer controller discards the oldest block data A in the buffer.

FIG. 8 shows a state in which after writing operation performed by the buffer controller 104 causes an error, the buffer controller 104 discards the oldest block data A in the buffer 108.

Figure 9:
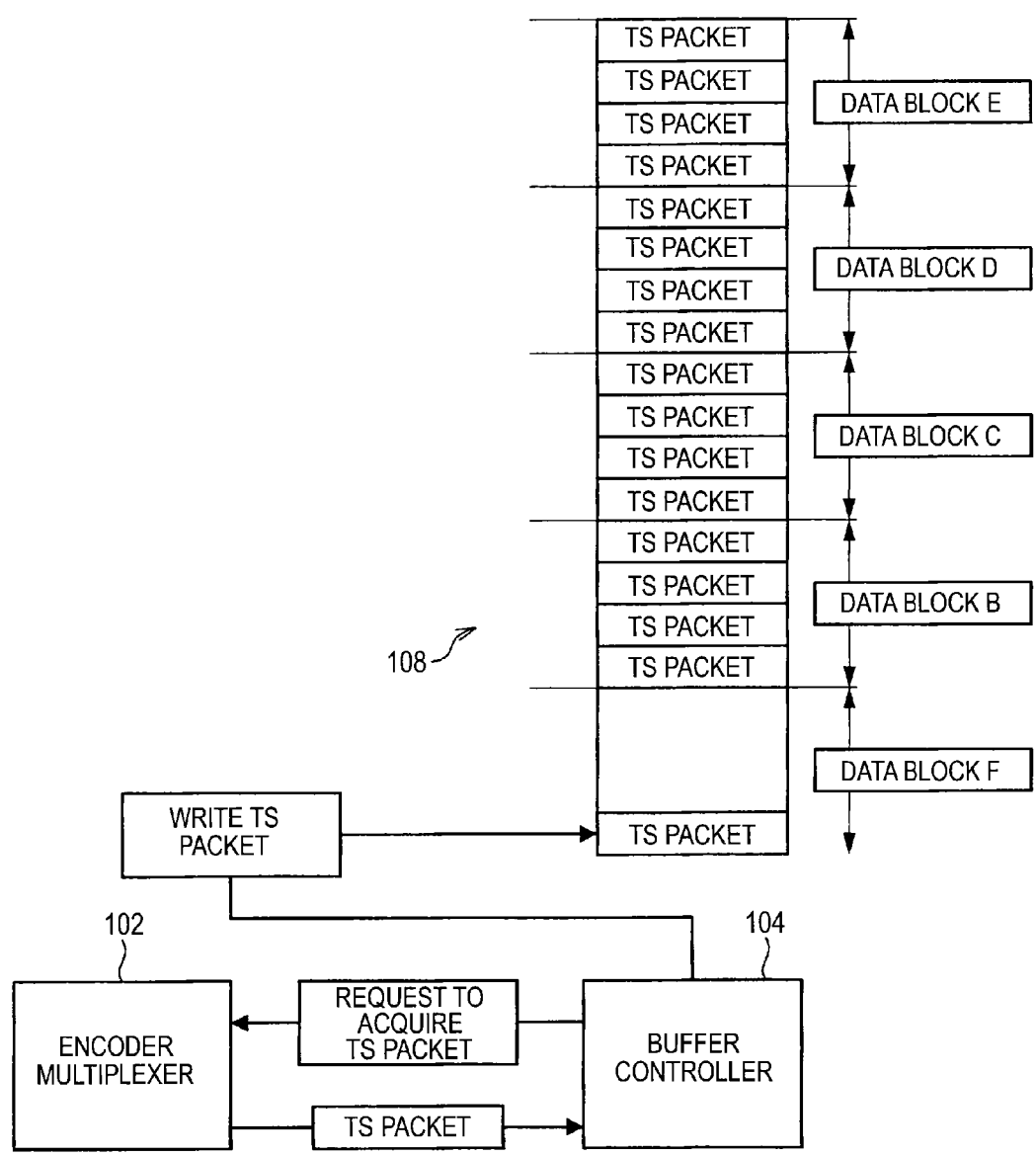
FIG. 9 is a diagrammatic view showing that after discarding the oldest block data A in the buffer, the buffer controller is writing a TS packet in a data block F to the free data area.

FIG. 9 shows that after discarding the oldest block data A in the buffer 108, the buffer controller 104 is writing a TS packet in a data block F to the free data area. Discarding the data block A allows the following data block F to be written, as shown in FIG. 9.

Figure 10:
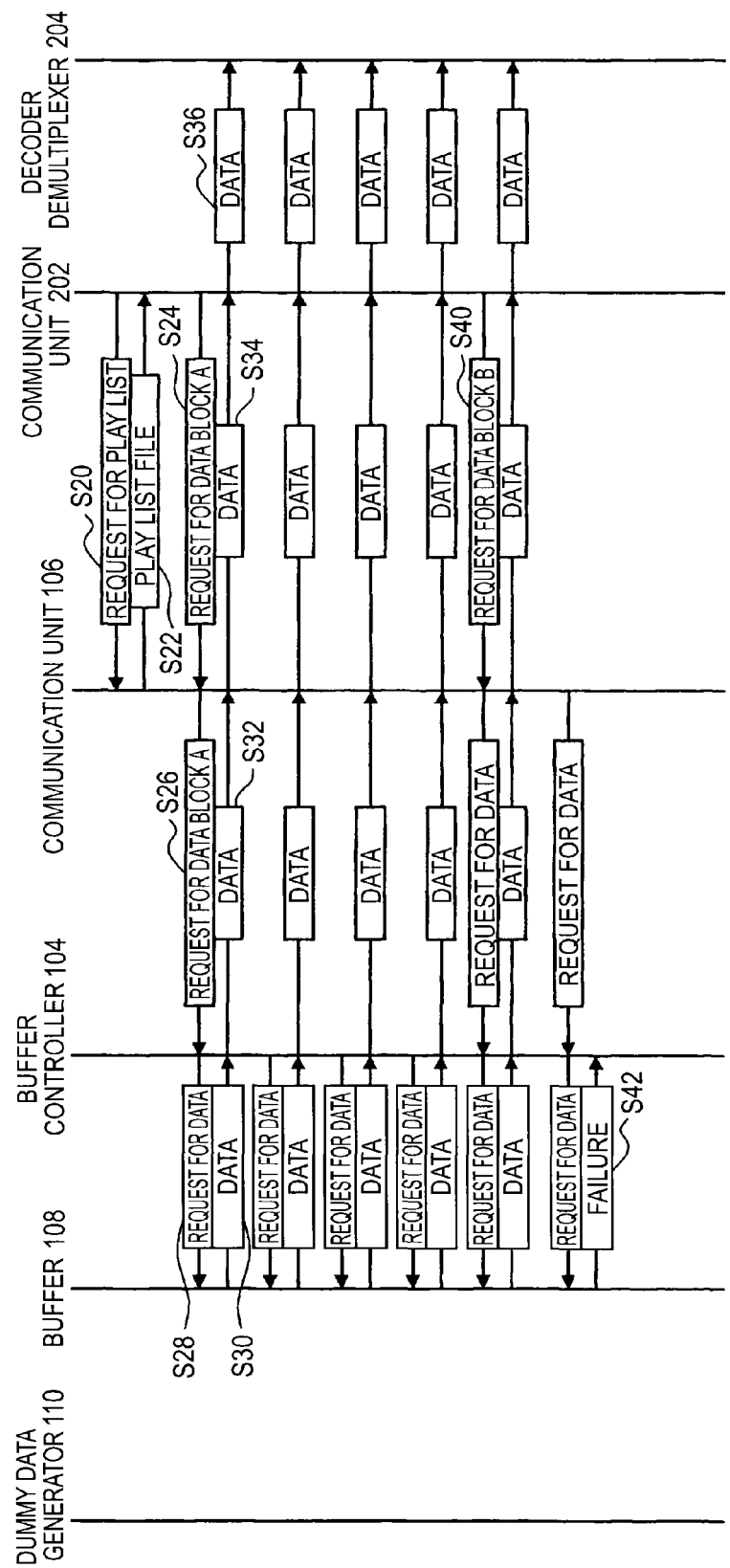
FIG. 10 is a diagrammatic view showing a data acquisition sequence carried out when a data block being acquired is unexpectedly deleted from the buffer during the data block acquisition.

6. Example of Data Acquisition Sequence Carried Out when Data Block being Acquired is Unexpectedly Deleted from Buffer During Data Block Acquisition FIG. 10 is a diagrammatic view showing a data acquisition sequence carried out when a data block being acquired is unexpectedly deleted from the buffer 108 during the data block acquisition. As shown in FIG. 10, all data in the data block A are successfully sent to the receiver 200. The data block B is, however, discarded from the buffer 108 during the acquisition of second data in the data block B from the buffer 108 as shown in FIG. 5, and the buffer controller 104 is incapable of acquiring the data block B and data thereafter from the buffer 108 (step S42).

As described above, the example in FIG. 10, in which the data block B is discarded during the acquisition of data in the data block B as described with reference to FIGS. 6 to 8, shows a situation in which the transmitter 100 is incapable of sending the data block B and data thereafter to the receiver 200. Immediately after transmitting a request to acquire the data block B, the receiver 200 recognizes the data length of the content (content-length) of the data block B in preparation for reception of a data block acknowledgment shown in FIG. 4 from the transmitter 100. The receiver 200 will therefore not acquire the following data block until the receiver 200 downloads the full content-length of data block B. In other words, no more video data will not be downloaded, resulting in termination of the download.

In the present embodiment, when the situation shown in FIG. 10 occurs, dummy data is generated to maintain the downloading.

7. Example of Sequence in which Dummy Data is Generated to Maintain Downloading

Figure 11:
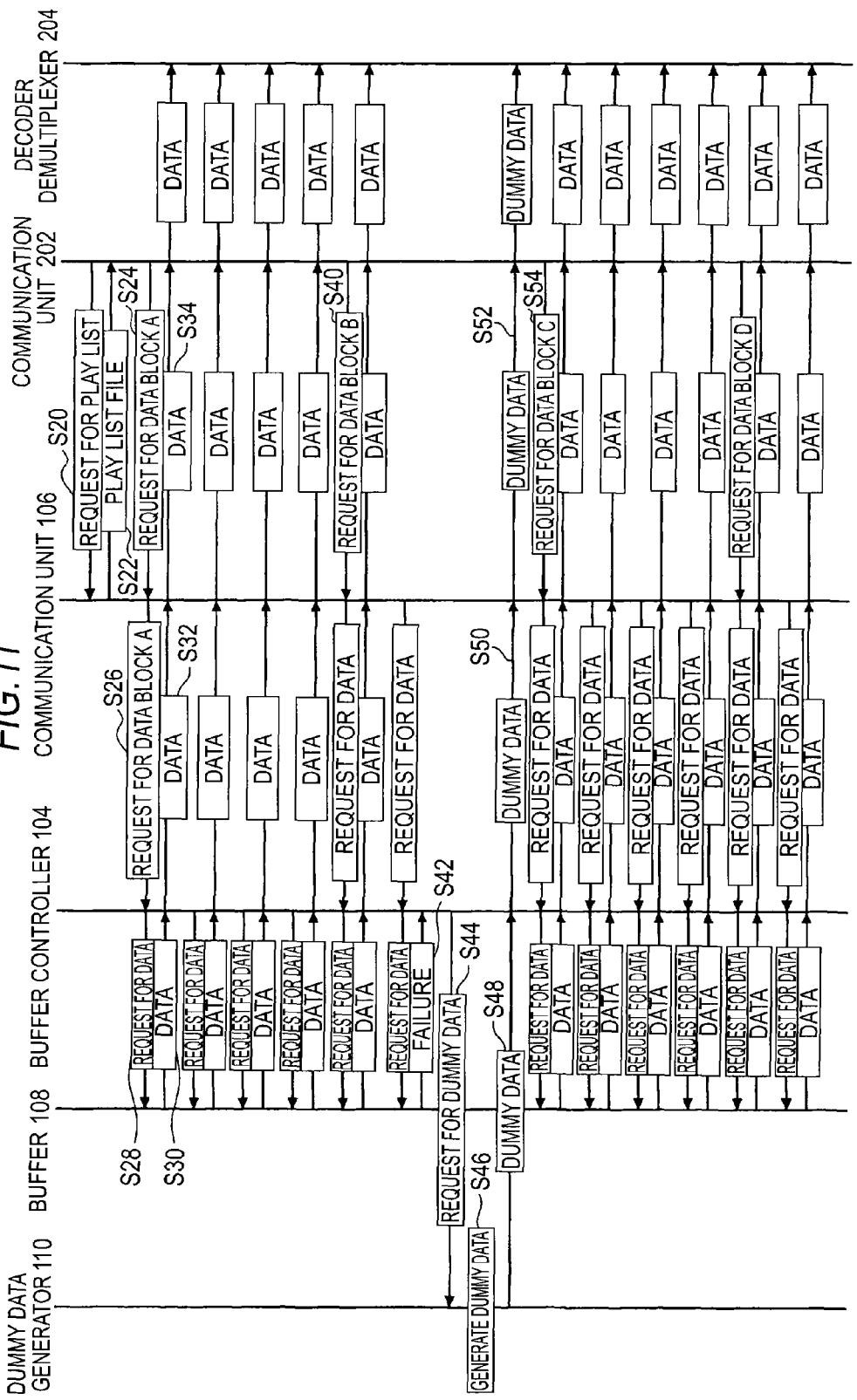
FIG. 11 is a diagrammatic view showing a sequence in which dummy data is generated to maintain the downloading in the present embodiment.

FIG. 11 is a diagrammatic view showing a sequence in which dummy data is generated to maintain the downloading. In FIG. 11, the processes in step S42 and the preceding steps are the same as those in FIG. 10.

When the buffer controller 104 tries to acquire the discarded data but fails to read the data (step S42), the buffer controller 104 requests the dummy data generator 110 to generate the missing amount of dummy data in the following step S44. Upon reception of the request, the dummy data generator 110 generates the dummy data (step S46). The generated dummy data is sent to the buffer controller 104 (step S48), which sends the data via the communication unit 106 to the communication unit 202 in the receiver 200 (steps S50 and S52).

The receiver 200 can thus receive data of the content-length shown in FIG. 4. Upon reception of the data of the content-length, the receiver 200 starts downloading the following data block C (step S54). In this way, even when data in a data block is unexpectedly discarded during data acquisition from the buffer 108, the downloading will not be terminated but the following data can be downloaded.

8. Operation of Generating Dummy Data

Figure 12:
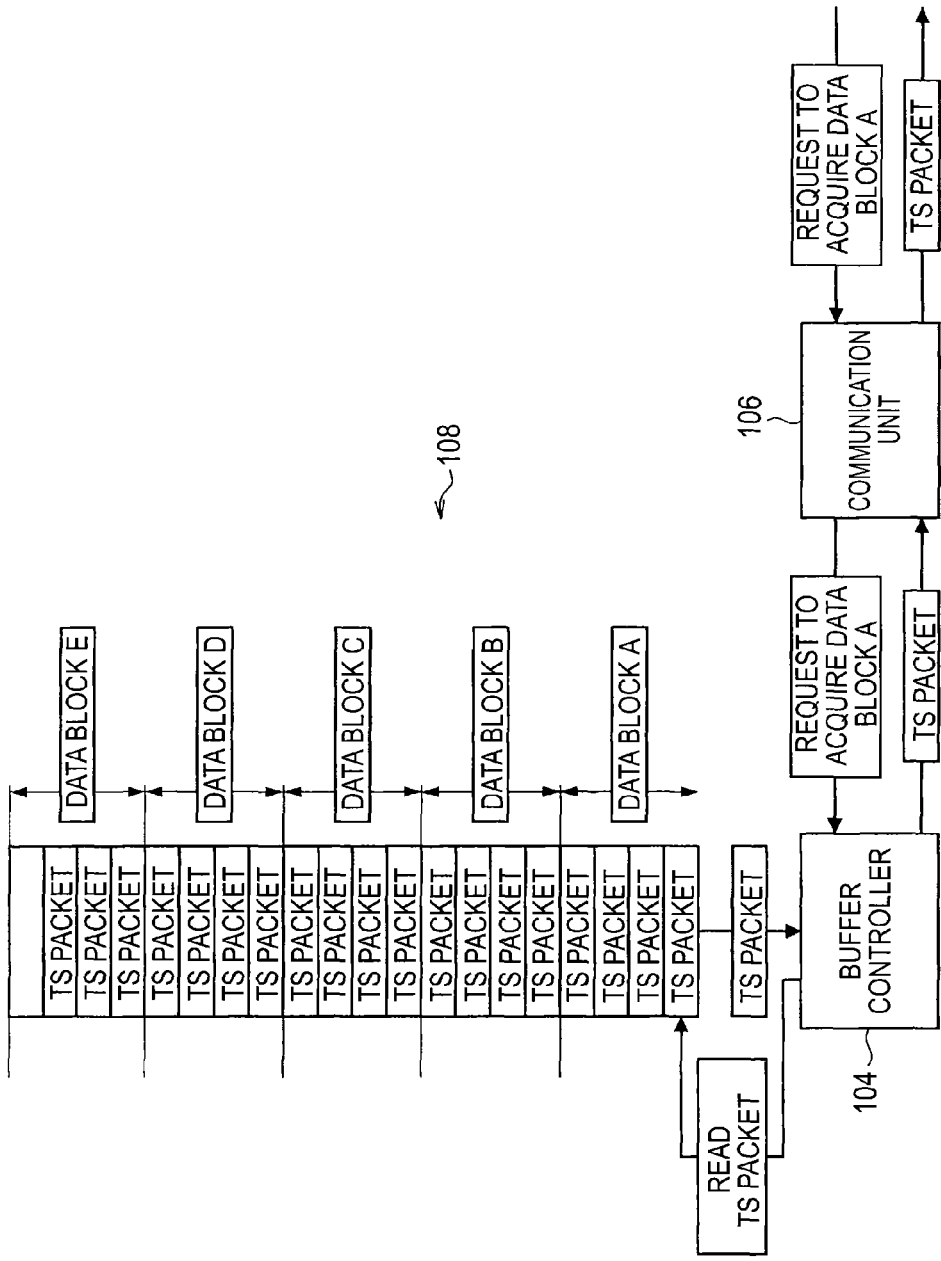
FIG. 12 is a diagrammatic view showing that the buffer controller is reading a TS packet in the data block A in the buffer.
Figure 13:
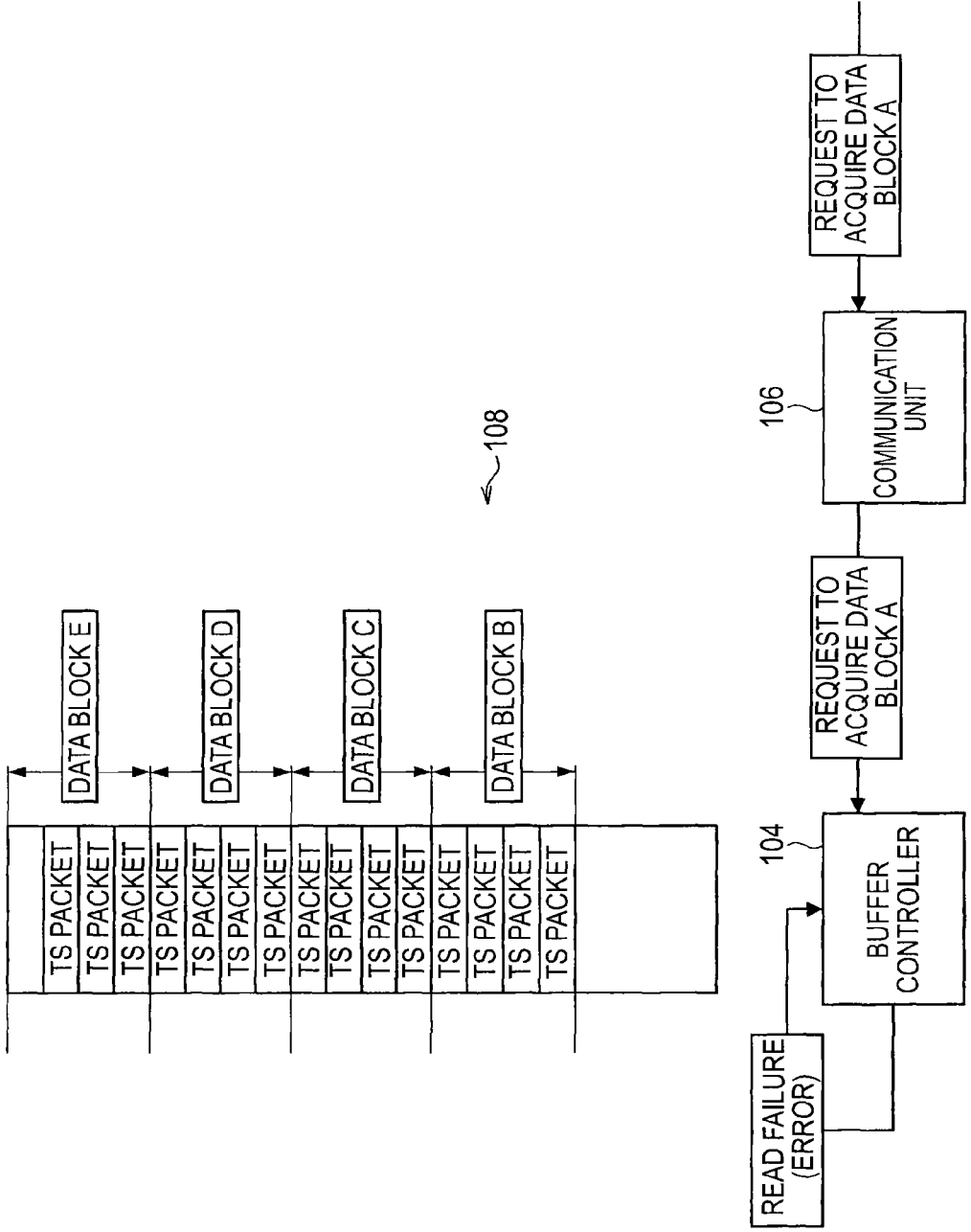
FIG. 13 is a diagrammatic view showing a state in which the data block A is discarded after the state shown in FIG. 12.
Figure 14:
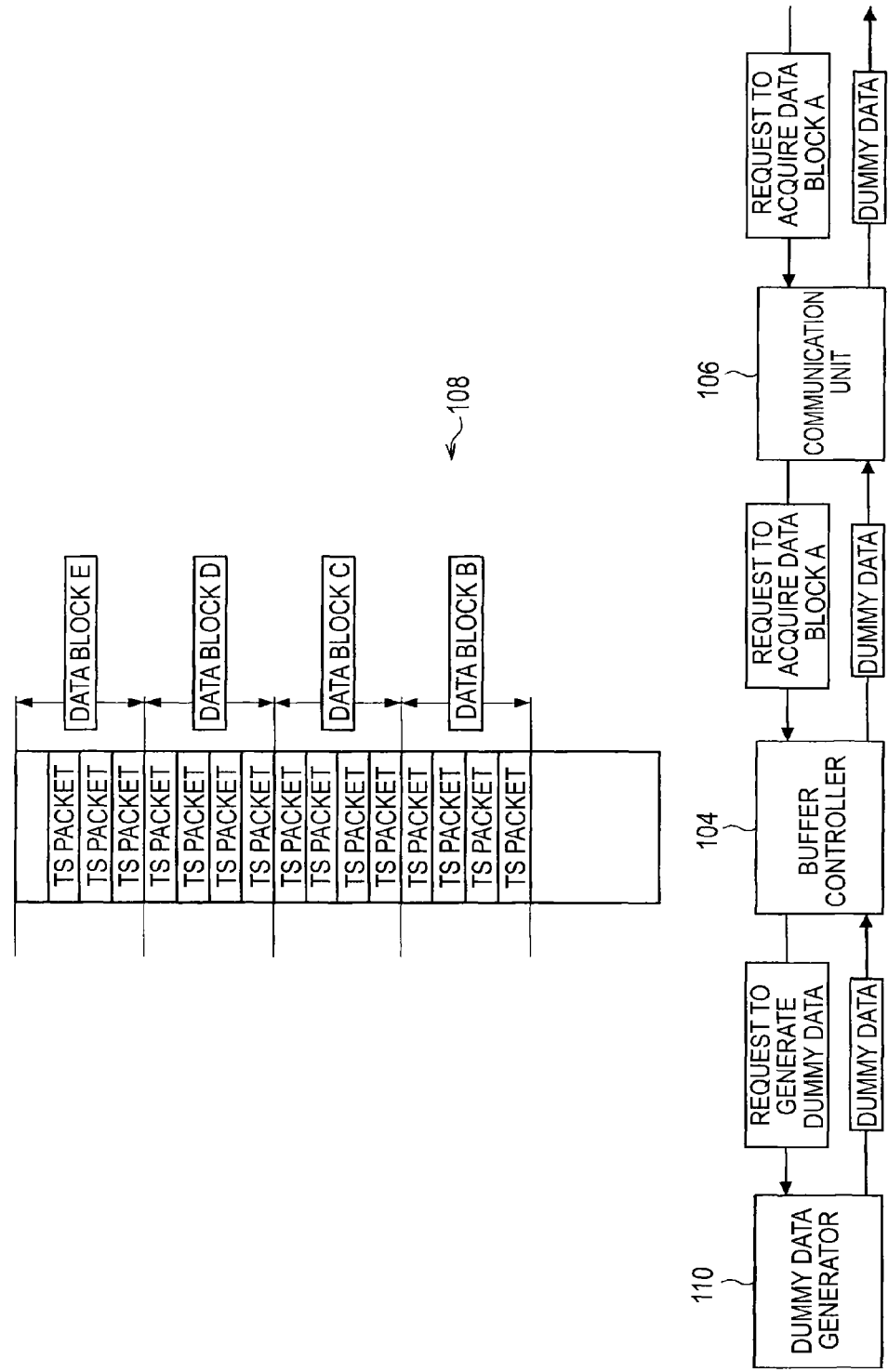
FIG. 14 is a diagrammatic view showing a state in which after an error occurs in FIG. 13, the buffer controller sends a dummy data generation request to a dummy data generator.

FIGS. 12 to 14 are diagrammatic views showing operation of generating dummy data. FIG. 12 shows that the buffer controller 104 is reading a TS packet in the data block A in the buffer 108.

FIG. 13 shows a state in which the data block A is discarded after the state shown in FIG. 12. In this case, an error occurs because the buffer controller 104 can read no PS packet in the data block A having been discarded.

FIG. 14 shows a state in which after the error occurs in FIG. 13, the buffer controller 104 sends a dummy data generation request to the dummy data generator 110. Upon reception the request, the dummy data generator 110 generates dummy data, which is sent to the buffer controller 104 and further sent to the receiver 200 via the buffer controller 104 and the communication unit 106.

Figure 15:
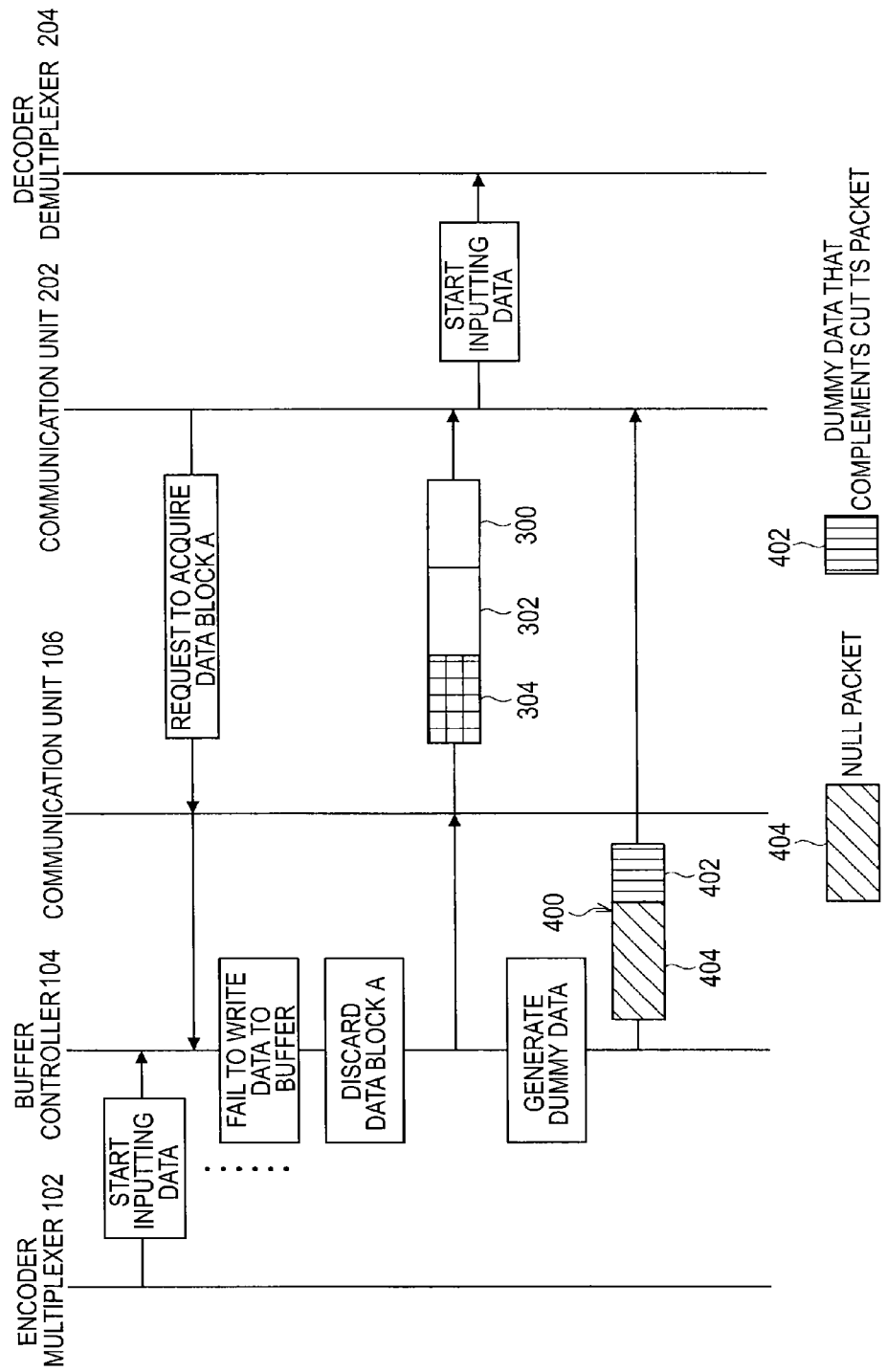
FIG. 15 is a diagrammatic view showing a summary of dummy data in IETF HTTP Live Streaming.

FIG. 15 is a diagrammatic view showing a summary of dummy data in IETF HTTP Live Streaming. In FIG. 15, the data block A in the buffer 108 is discarded in step S42 during the transmission of TS packets 300, 302, and 304. The first and second TS packets 300, 302 have reached the receiver 200, but the third TS packet 304 is cut halfway and only part of the TS packet 304 has reached the receiver 200. Dummy data 400 is formed of data 402 that complements the untransmitted portion of the TS packet 304 that has been cut and a NULL packet 404 corresponding to a TS packet that is yet to be transmitted (corresponding to fourth TS packet), and the thus configured dummy data 400 is transmitted through the communication unit 106 to the communication unit 202 in the receiver 200.

The size of dummy data generated in IETF HTTP Live Streaming is determined by the following expressions.

data block size=TS packet size×number of packets number of NULL packets transmitted as dummy data=(data block size−transmitted data size)/TS packet size (size of dummy data that complements fragmented TS packet=(data block size−transmitted data size) % TS packet size)

A data block is formed of a certain number of TS packets, and a single TS packet has a size of 188 bytes (192 bytes in the case of TS packet with time stamp).

The size of a data block is therefore 188 bytes (192 bytes in the case of TS packet with time stamp)×number of packets.

The number of NULL packets 404 to be sent as dummy data is (data block size−transmitted data size)/TS packet size, and the size of the data 402 that complements a fragmented TS packet is the remainder of the division.

9. Example of Contents of TS Packet Transmitted as Dummy Data

Figure 16:
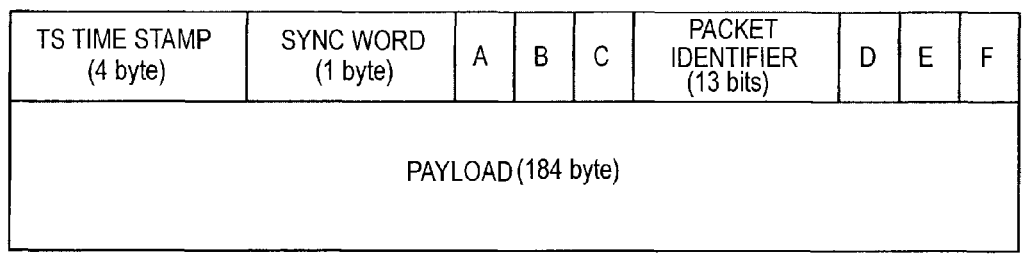
FIG. 16 is a diagrammatic view showing an example of contents of a TS packet to be transmitted as dummy data.

FIG. 16 is a diagrammatic view showing an example of contents of a TS packet (NULL packet 404) transmitted as dummy data. Each data in the NULL packet 404 is, for example, set to be invalid data. In the case of TS packet with a time stamp, TS (time stamp) is set at zero, and a sync word is set at (0x47).

Further, a transport error indicator A (1 bit) shown in FIG. 16 is set at 1, which represents an error, and a payload unit start indicator B (1 bit) and a transport priority C (1 bit) shown in FIG. 16 are set at zero. Further, a packet identifier (13 bits) is set at (0x1ff), which represents a NULL packet. A transport scramble control D (2 bits), an adaptation field control E (2 bits), and a cyclic counter F (4 bits) are also set at zero. A payload (184 bytes) is set to be dummy data (0x00 or 0xFF, for example). The dummy data 402 that complements a fragmented TS packet is generated from part of the NULL packet 404. The communication unit 106, which can detects the amount of data having been read from the buffer 108, can detect the amount of data having been transmitted in each data block. The communication unit 106 can therefore detect that all data in the third TS block 304 have not been successfully transmitted and how many bits in the third TS packet 304 have been successfully transmitted. Since each TS packet is so transmitted that the TS (time stamp), the sync word, the transport error indicator A, the payload unit start indicator B, and the following data are transmitted in this order, the communication unit 106 can detect which portions of the third TS packet 304 have been transmitted. The dummy data generator 110 generates dummy data 402 corresponding to the amount of untransmitted data in the TS packet 304 and generates the NULL packet 404 based on the information described above along with the calculation expressions described above.

10. Example of MP4 File Format

In Adobe HTTP Dynamic Streaming and Microsoft HTTP Smooth Streaming, dummy data can be generated in the same manner as described above although the play list file formats differ from each other.

Figure 17:
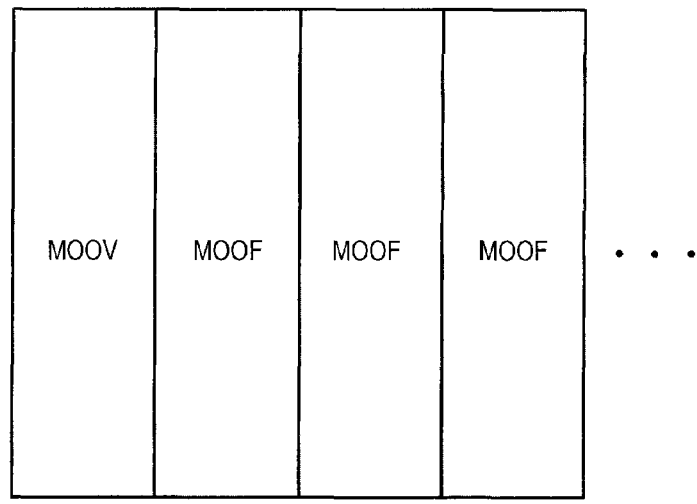
FIG. 17 is a diagrammatic view showing a simplified MP4 file format.

In the two streaming methods described above, in which the data file format is not MPEG2-TS but is MP4, the amount of data that has not been transmitted can be calculated based on the data length that should be transmitted and the amount of data that has been transmitted, as in the case of MPEG2-TS. Dummy data can therefore be generated based on the amount of data that has not been transmitted. FIG. 17 is a diagrammatic view showing a simplified MP4 file format. A single MP4 file is primarily formed of MOOV (movie metadata) and MOOFs (movie fragments). In IETF HTTP Live Streaming described above, a single data block is handled as a single file, but in a method using MP4, a single data block corresponds to a single MOOF (movie fragment). Although a MOOF has a variable length, the dummy data generator 110 can generate dummy data of a data size calculated by (data block length−transmitted data length). The dummy data can then be transmitted through the communication unit 106.

According to the present embodiment described above, even when buffering or any other measures performed by the transmitter 100 is not effective enough but an error occurs, communication will not be terminated but can be maintained.

Preferred embodiments of the present disclosure have been described in detail with reference to the accompanying drawings, but the technical scope of the present disclosure is not limited to the embodiments. Those skilled in the technical field of the present disclosure will obviously come up with a variety of changes or modifications within the category of technical spirit set forth in the appended claims, and these changes or modifications, of course, fall within the technical scope of the present disclosure.

The following configurations also belong to the technical scope of the present disclosure.

(1) A communication apparatus including a buffer that accumulates a plurality of data blocks, a buffer controller that reads the data blocks from the buffer to transmit the data blocks, and a transmission unit that transmits, when any of the data blocks is discarded from the buffer during the transmission of the data blocks, dummy data in place of an untransmitted portion of the data block having been discarded.

(2) The communication apparatus described in (1), further including a dummy data generator that generates, when any of the data blocks is discarded from the buffer during the transmission of the data blocks, dummy data corresponding to the untransmitted portion of the data block having been discarded, wherein the transmission unit transmits not only the data blocks read from the buffer but also the dummy data in place of the untransmitted portion of the data block having been discarded when the dummy data is generated.

(3) The communication apparatus described in (2), wherein the data is expressed in an MPEG2-TS format and a predetermined number of TS packets form each of the data blocks, and the dummy data generator generates, when any of the data blocks is discarded during the transmission of the data blocks, the dummy data including data corresponding to an untransmitted portion of a TS packet that has been cut halfway and a TS packet that is yet to be transmitted.

(4) The communication apparatus described in (2),
wherein the data is expressed in an MP4 format and a MOOF forms each of the data blocks, and
the dummy data generator generates, when any of the data blocks is discarded during the transmission of the data blocks, data corresponding to an untransmitted portion of the MOOF as the dummy data.

(5) A communication system including
a communication apparatus including
a buffer that accumulates a plurality of data blocks,
a buffer controller that reads the data blocks from the buffer to transmit the data blocks in response to a transmission request, and
a transmission unit that transmits, when any of the data blocks is discarded from the buffer during the transmission of the data blocks, dummy data in place of an untransmitted portion of the data block having been discarded, and
a reception apparatus that transmits the transmission request to the communication apparatus and receives the data blocks and the dummy data transmitted from the transmission unit.

(6) A transmission method including
accumulating a plurality of data blocks in a buffer and reading the data blocks to transmit the data blocks, and
transmitting, when any of the data blocks is discarded from the buffer during the transmission of the data blocks, dummy data in place of an untransmitted portion of the data block having been discarded.

(7) A program that allows a computer to function as
means for accumulating a plurality of data blocks in a buffer and reading the data blocks to transmit the data blocks, and
means for transmitting, when any of the data blocks is discarded from the buffer during the transmission of the data blocks, dummy data in place of an untransmitted portion of the data block having been discarded.

The present disclosure contains subject matter related to that disclosed in Japanese Priority Patent Application JP 2011-128358 filed in the Japan Patent Office on Jun. 8, 2011, the entire contents of which are hereby incorporated by reference.

What is claimed is:

1. A communication apparatus comprising:
a Central Processing Unit (CPU) configured to:
control accumulation of a plurality of data blocks in a buffer;
read the accumulated plurality of data blocks from the buffer to transmit the plurality of data blocks;
generate, when any of the plurality of data blocks is discarded from the buffer during the transmission of the plurality of data blocks, dummy data corresponding to an untransmitted portion of the data block having been discarded; and
transmit the generated dummy data in place of the untransmitted portion of the data block having been discarded,
wherein the plurality of data blocks are expressed in an MPEG2-TS format and a predetermined number of TS packets form each of the plurality of data blocks, and
wherein the generated dummy data includes data corresponding to an untransmitted portion of a TS packet that has been cut halfway and a TS packet that is yet to be transmitted.

2. The communication apparatus according to claim 1,
wherein the generated dummy data is transmitted in place of the untransmitted portion of the data block having been discarded when the dummy data is generated, along with the read plurality of data blocks.

3. The communication apparatus according to claim 2,
wherein the data is expressed in an MP4 format and a MOOF forms each of the plurality of data blocks, and
wherein the dummy data is generated when any of the plurality of data blocks is discarded during the transmission of the plurality of data blocks, the dummy data including data corresponding to an untransmitted portion of the MOOF as the dummy data.

4. A communication system comprising:
a first Central Processing Unit (CPU) configured to:
control accumulation of a plurality of data blocks in a buffer;
read the plurality of data blocks from the buffer to transmit the plurality of data blocks in response to a transmission request;
generate, when any of the plurality of data blocks is discarded from the buffer during the transmission of the plurality of data blocks, dummy data corresponding to an untransmitted portion of the data block having been discarded; and
transmit the generated dummy data in place of the untransmitted portion of the data block having been discarded,
wherein the plurality of data blocks are expressed in an MPEG2-TS format and a predetermined number of TS packets form each of the plurality of data blocks, and
wherein the generated dummy data includes data corresponding to an untransmitted portion of a TS packet that has been cut halfway and a TS packet that is yet to be transmitted; and
a second Central Processing Unit (CPU) configured to transmit a transmission request to the first CPU and receive the read data blocks and the transmitted dummy data.

5. A transmission method comprising:
accumulating a plurality of data blocks in a buffer and reading the plurality of data blocks to transmit the plurality of data blocks;
generating, when any of the plurality of data blocks is discarded from the buffer during the transmission of the plurality of data blocks, dummy data corresponding to an untransmitted portion of the data block having been discarded; and
transmit the generated dummy data in place of the untransmitted portion of the data block having been discarded,
wherein the plurality of data blocks are expressed in an MPEG2-TS format and a predetermined number of TS packets form each of the plurality of data blocks, and
wherein the generated dummy data includes data corresponding to an untransmitted portion of a TS packet that has been cut halfway and a TS packet that is yet to be transmitted.

6. A non-transitory computer-readable storage medium having stored thereon, a set of computer-executable instructions for causing a computer to perform steps comprising:
accumulating a plurality of data blocks in a buffer and reading the plurality of data blocks to transmit the plurality of data blocks;
generating, when any of the plurality of data blocks is discarded from the buffer during the transmission of the plurality of data blocks, dummy data corresponding to an untransmitted portion of the data block having been discarded; and transmit the generated dummy data in place of an untransmitted portion of the data block having been discarded, wherein the plurality of data blocks are expressed in an MPEG2-TS format and a predetermined number of TS packets form each of the plurality of data blocks, and wherein the generated dummy data includes data corresponding to an untransmitted portion of a TS packet that has been cut halfway and a TS packet that is yet to be transmitted.

* * * * *